ARRANGEMENT FOR CONTROLLING TRAFFIC IN A SWITCHING NETWORK

Filed Nov. 5, 1963

6 Sheets-Sheet 1

INVENTORS P. J. BURKE
K. D. HOPPER
E. E. SCHWENZFEGER

BY S E Hollander

ATTORNEY

Aug. 8, 1967 P. J. BURKE ETAL 3,335,229

ARRANGEMENT FOR CONTROLLING TRAFFIC IN A SWITCHING NETWORK

Filed Nov. 5, 1963 6 Sheets-Sheet 2

Aug. 8, 1967 P. J. BURKE ET AL 3,335,229

ARRANGEMENT FOR CONTROLLING TRAFFIC IN A SWITCHING NETWORK

Filed Nov. 5, 1963 6 Sheets-Sheet 3

Aug. 8, 1967 P. J. BURKE ET AL 3,335,229

ARRANGEMENT FOR CONTROLLING TRAFFIC IN A SWITCHING NETWORK

Filed Nov. 5, 1963 6 Sheets-Sheet 4

Aug. 8, 1967 P. J. BURKE ETAL 3,335,229

ARRANGEMENT FOR CONTROLLING TRAFFIC IN A SWITCHING NETWORK

Filed Nov. 5, 1963 6 Sheets-Sheet 6

3,335,229
Patented Aug. 8, 1967

3,335,229

ARRANGEMENT FOR CONTROLLING TRAFFIC IN A SWITCHING NETWORK

Paul J. Burke, Red Bank, Kenneth D. Hopper, Holmdel, and Edward E. Schwenzfeger, Red Bank, N.J., assignors to Bell Telephone Laboratories, Incorporated, New York, N.Y., a corporation of New York Filed Nov. 5, 1963, Ser. No. 321,597
17 Claims. (Cl. 179—18)

This invention relates to switching networks and particularly to arrangements for controlling the distribution of traffic in a switching network.

More specifically, this invention relates to communication networks wherein instrumentalities are employed for minimizing the effects on the network of traffic overloads at individual switching offices serving the network.

In a very particular aspect this invention relates to telephone switching networks served by a plurality of switching offices wherein the routing of traffic at one office may be controlled from another office which is experiencing a traffic overload, to divert traffic from the overloaded office until the load thereat subsides.

Integrated switching networks, such as large nationwide communication networks, experience abnormal traffic surges which often congest the network and degrade customer service. Certain abnormal traffic conditions are expected and occur at predictable times for instance, if a hypothetical telephone system has included in its network a seasonal resort area, it is expected that the traffic demands on the telephone facilities serving this area will be greater during the season when the resort is at its height of activity. Under these predictable situations, preventive measures can be taken to minimize overloads by providing additional temporary facilities to care for the seasonal traffic demands. The temporary facilities, when no longer needed, can then be relocated and utilized in other areas to care for the abnormal seasonal demands in these areas.

On the other hand, certain abnormal traffic conditions in a communication network are unforeseeable and may occur as a result of hurricanes, floods, defense emergencies or other similar situations. It would be impractical and uneconomical to provide sufficient facilities to care for all possible, yet unpredictable, overload conditions, but nevertheless, an overload in one small area of an integrated network may adversely effect service in the entire network including those areas that have an appreciable margin of facilities.

Typically, a large nationwide telephone network is made up of smaller switching networks or regions. Each region is served by one or more trunk interconnected control switching points for establishing communication paths within the region and for establishing connections to and from other regions. These control switching points are usually classified in ascending order as toll centers, primary outlets, sectional centers and regional centers. The toll centers each serve a plurality of local switching offices which, in turn, serve the telephone customers of the various cities and towns in the toll center area. Primary outlets, in addition to serving many toll centers, also serve as switching points for calls between toll center areas. Sectional centers, on the other hand, serve traffic between toll center areas in a given section and may also serve to switch calls between toll centers and primary outlets. While regional centers may also serve as toll centers within their region, they are primarily used for switching calls between primary outlets, sectional centers and to and from other regional centers.

Calls between two local offices are, therefore, established by serially interconnecting a plurality of control switching points in the appropriate trunk route between the two local offices. Advantageously, each control switching point is connected by trunks to many other control switching points thereby permitting a selection of alternate routes if the most direct, or first choice, trunk routes to any given office are unavailable.

Flexible alternate rounting provisions are desirable at control switching points to more fully utilize all network trunking and switching facilities that are available. For instance, one region may be experiencing a large amount of traffic while, due to a time zone differential or customer calling habits, a second region might be experiencing relatively little traffic. It is, therefore, advantageous to temporarily route traffic over alternate route facilities in the relatively idle region to help serve calls in the busy region.

By permitting relatively unrestricted alternate routing, however, certain events take place which may hamper over-all network performance at the expense of a few calls. As an example, a control switching point receives digital information, as to the called customer's telephone number, over a trunk incoming from the calling office. This information is registered in common equipment including a register or sender at the switching point. The common equipment at this control switching point then determines the best routing and looks for an idle trunk in that route. If no trunks are available in the first choice route, the common equipment ascertains what the next best, or first alternate, route is and looks for an idle trunk in the alternate route. At large control switching points such as regional centers having access to numerous routes, many alternate selections are available, and certain common control equipment may be held busy for prolonged periods while this equipment is laboriously searching for an idle trunk in an available route to dispose of one particular call.

Although it is advantageous to permit a small amount of traffic incoming to a busy regional center to wait for common control equipment that may imminently become available, it must also be realized that other control switching points, such as toll centers, primary outlets and sectional centers seeking to route traffic through the busy regional center, may be inconvenienced by this waiting. This results in a longer holding time for the common equipment at the toll centers, primary outlets and sectional centers seeking access to the busy regional center, which in turn causes incoming calls to these control switching points from local offices and other control switching points to also be delayed. If this situation is allowed to prevail for any length of time without control, traffic begins to back up and the entire network may rapidly become congested because of an overload at one strategically located switching point. In other words, an overload at one control switching point might set off a chain reaction causing delays at virtually every other switching center in the network. These delays generally result in common equipment time out requiring the calling customer to make another attempt to complete his call. Numerous "time outs" and "second attempts" aggravate the situation by generating more traffic for the apparently overloaded network.

It is, therefore, one object of this invention to minimize the effects on the network of traffic overloads occurring at individual switching points.

Various schemes have heretofore been devised to control traffic in a network. For example, arrangements are known whereby supervisory personnel are provided with instruments for evaluating the traffic situations at important control switching points. If an overload is detected at one of these monitored control switching points, the supervisory personnel notify those control switching points having access to the overloaded switching point so that necessary steps can be taken to manually reroute traffic away from the busy switching point. It will be readily appreciated, however, that arrangements such as these, requiring human decision making and coordination, are cumbersome and far too slow in this era of high speed switching systems where traffic overloads are sporadic and of very short duration.

It is, therefore, another object of this invention to improve the responsiveness of traffic overload control arrangements in a switching network.

Still other arrangements are known for controlling overloads in a switching network whereby trunks between two control switching points are monitored at the originating switching point, and, when a predetermined number of the trunks become busy, the routing of certain calls at the originating switching point is altered, reserving the remaining trunks in that route for special calls which may not have alternate routes. Of course, with this arrangement, wherein the rerouting is under control of the individual originating switching points, calls may be prematurely diverted from a control switching point which still has a substantial margin of equipment available for handling additional calls just because a trunk group busy condition occurred in one route.

It is, therefore, a further object of this invention to improve traffic overload control arrangements by making them more sensitive to impending overloads at centralized switching points.

In accordance with one specific embodiment of this invention a regional center, designated herein as St. Louis, is provided as a control switching point for calls to and from a plurality of toll centers. For reference purposes, the toll centers have been designated as Denver, Dallas, New York and Miami. Denver and Dallas calls to and from the Miami and New York toll centers are routed through the St. Louis regional center, however, if the trunks via St. Louis are unavailable, alternate trunks are available through another regional center designated Chicago. It is to be understood, of course, that the use of specific geographic designations for the various switching centers is solely employed herein as an aid to the reader in appreciating the scope and nature of the problems solved by our invention and is in no sense to be considered as limiting or necessary; in fact, these may be considered as arbitrary designations employed herein merely for convenience and as exemplary.

At the St. Louis regional center as overload detector circuit is employed to monitor the number of trunks incoming from the toll centers to St. Louis that are waiting to be served by the common control equipment at St. Louis. This detector circuit has a variable input which can be set to operate at a particular level of "trunks waiting," and when operated, the circuit transmits an overload signal to the toll centers that normally route calls through St. Louis. This overload signal is effective at these toll centers to change the routing instructions thereat, thus causing traffic to be diverted from St. Louis and routed over alternate routes, such as through the Chicago regional center. The traffic is diverted from St. Louis even though idle trunks may be available to St. Louis until the overload condition subsides as indicated by the circuit detecting less than the predetermined number of trunks waiting for common equipment. Upon this event, a no-overload signal is sent to the Denver, Dallas, New York and Miami toll centers restoring the routing instructions at these toll centers to normal.

A feature of this invention resides in an arrangement for automatically controlling distribution of traffic in a network in accordance with impending overloads at switching offices serving the network.

Another feature of the invention is found in a switching network traffic control arrangement wherein means are provided for transmitting to switching offices signals indicative of an overload condition at another switching office.

A more specific feature of this invention resides in an arrangement for minimizing the effects of traffic overloads in a telephone switching network wherein means are provided at a first switching office for detecting when an excessive number of calls are awaiting service thereat, wherein signals are sent to other switching offices having access to the first office to inform the other offices of an overload at the first office, and wherein means responsive to the overload signals are provided at the other offices for diverting calls from the overloaded office until the overload subsides.

These and other objects and features of the invention will become readily apparent from the following description made with reference to the drawing, in which.

GENERAL DESCRIPTION

The arrangement and operation of the various components in the illustrative embodiment of this invention will be described subsequently with reference to the detailed FIGS. 2–6. However, in order to first gain an over-all general understanding of the arrangement contemplated, a brief and general description will first be given with reference to FIG. 1.

*Arrangement of components*

Figure 1:
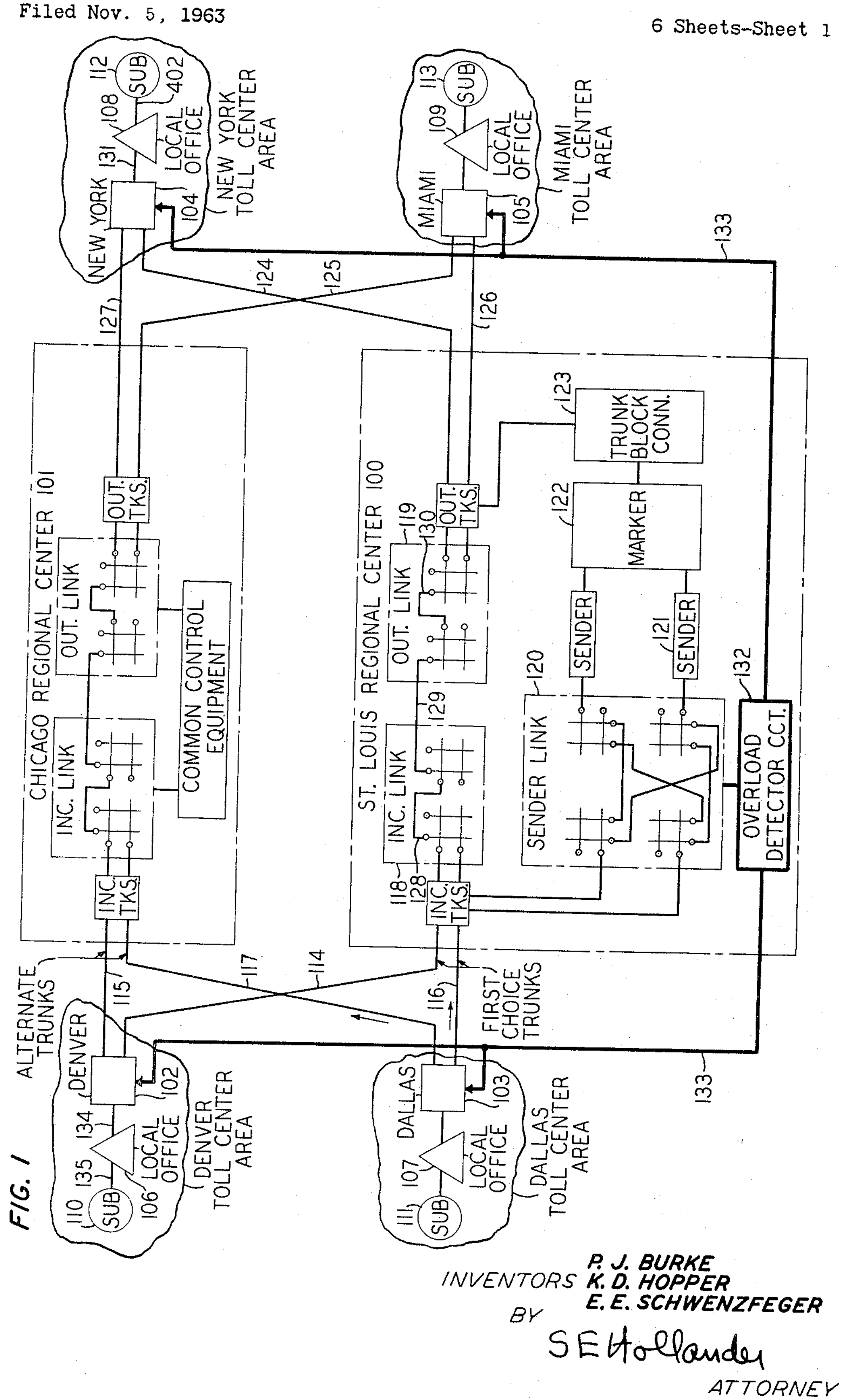
FIG. 1 shows a block diagram of our invention employed in a telephone switching network.

Referring, therefore, to FIG. 1 there is shown a typical telephone network having two regional centers, 100 and 101, designated St. Louis and Chicago, respectively. These regional centers serve calls to and from many toll center areas four of which are shown and designated, Denver, Dallas, New York and Miami.

Of course, it will be realized that the names given to the various localities have been assumed only for the purpose of illustration, and are not in any way intended to depict an actual telephone network and its communities.

In each of the telephone center areas there is shown a toll switching office and a local switching office. The toll switching offices are represented by the rectangles designated 102–105, and each toll switching office or toll center, as it is sometimes referred to, serves many local offices within the area. To simplify the drawing, however, only one local office has been shown in each of the toll center areas, and these local offices are represented by the triangles designated 106–109. These, and similar local offices, serve the telephone customers in the various cities and towns in the toll center areas.

While each local office may be capable of serving thousands of telephone customers, only one customer has been shown connected to each of the local offices, and these customers are represented by the circles designated 110–113.

The customers are connected to their local offices over telephone lines in a well-known manner, and each local office is connected to its home tandem, i.e., the tandem center serving the toll center area in which the local office is located, over trunks. For example, local office 106 is connected to toll center 102 in the Denver toll center area over trunk group 134 which may comprise many trunks. It is over these trunks in trunk group 134 that calls are extended to and from local office 106 to be completed either within the Denver toll center area or to and from other toll center areas.

To complete calls to and from the Denver toll center area and to other areas, the Denver toll center is connected over trunk groups to the appropriate regional centers. Trunk group 114 connects the Denver toll center 102 with the St. Louis regional center 100, and trunk group 115 connects the Denver toll center 102 with the Chicago regional center 101. In a similar manner the toll centers in Dallas, New York and Miami are connected to the regional centers over various trunk groups as shown in FIG. 1.

It will be noted that trunk groups 114 and 116 to St. Louis are designated "first choice trunks" while trunk groups 115 and 117 are designated "alternate trunks." In other words, for the switching plan contemplated, calls originating at Denver and Dallas to be terminated in New York or Miami will be switched via St. Louis over first choice trunk groups 114 and 116, but if all trunks in these groups are busy, trunk groups 115 and 117 via Chicago would be made available for selection at toll centers 102 and 103, respectively.

At each of the regional centers 100 and 101 there is shown a block diagram of a typical switching office. Reference will be made to the diagram for the St. Louis switching office 100 which is shown in detail, but for the purpose of this example it can be assumed that switching office 101 at Chicago is identical.

Switching office 100 comprises an incoming link 118 on which trunks incoming from the various toll centers appear and outgoing link 119 on which trunks outgoing to the various toll centers appear and common control equipment of which only sender link 120, sender 121, marker 122 and trunk block 123 are shown.

While only trunk groups incoming from Denver and Dallas and trunk groups outgoing to New York and Miami are shown, it will be readily understood that trunk groups are also provided from St. Louis outgoing to Denver and Dallas and incoming to St. Louis from New York and Miami, but these trunk groups have been omitted from the drawing for clarity of illustration.

Since St. Louis is in the first choice group for calls from Denver and Dallas in this example, an overload detector 132 has been advantageously located at St. Louis to detect impending overloads thereat. In this illustrative embodiment overload detector 132 has been shown connected to sender link 120 to monitor the number of trunks incoming to St. Louis that are waiting for service or interconnection to a sender. While this arrangement affords a convenient method of ascertaining traffic loads at a switching center, it will be readily understood that detector 132 can also be connected to other suitable switching control mechanisms depending on the particular needs and design of the switching center involved.

Overload detector 132 is connected to the various toll centers via signaling channel 133, and it is over this signaling channel that signals are sent to the various toll centers to inform them of the traffic load condition at St. Louis. Equipment responsive to signals over channel 133 has been provided at each toll center in accordance with our invention, and this equipment, described further below, is effective under the control of load signals to alter the routing of traffic at the various toll centers so that calls may be diverted from St. Louis in the event of an overload at St. Louis.

A better understanding of the arrangement will be realized from the following description with respect to the establishment of a typical call in the network.

*Call from Denver to New York via St. Louis*

The establishment of a typical call from customer 110 in the Denver area to customer 112 in the New York area via available St. Louis facilities will now be described to illustrate the general over-all operation of the network.

Customer 110 in the Denver toll center area, wishing to call customer 112 in the New York area, lifts his telephone receiver and dials over his line 135 to local office 106 information as to the area code for the New York toll center area followed by the local office code and telephone number assigned to customer 112. This information might, for example, consist of ten digits such as the area code 212 for New York, the local office code CH3 and telephone number 1000 for customer 112 in New York.

Local office 106, upon receiving these ten digits, recognizes that the call is outside the local toll center area and selects and idle trunk from trunk group 134 to its home toll center 102. Upon seizing an idle trunk in this group, the ten digits are pulsed over the trunk by one of the many well-known pulsing techniques from local office 106 to common equipment in the Denver toll center 102.

The common equipment at the Denver toll center 102 recognizes 212 as the New York area code and ascertains from its routing instructions the first choice trunk route to New York, which in this example includes trunk group 114 via St. Louis. If it is assumed that idle trunks are available in trunk group 114, the common equipment at toll center 102 selects an idle trunk and waits for the common equipment, such as sender 121 at St. Louis, to attach itself to the idle trunk in order to receive the digits when they are outpulsed from toll center 102. When an idle trunk is seized at toll center 102, the distant end of the trunk at St. Louis causes itself to be attached to a sender, such as sender 121 via sender link 120. Sender 121 is attached to the trunk, and a "sender attached" signal is returned to toll center 102 requesting that toll center 102 outpulse the digital information over the trunk that was seized. The ten digits are then pulsed over the trunk and registered in sender 121.

Through various translating arrangements, not shown, the common equipment at St. Louis recognizes that the call is for the New York area and selects a trunk from outgoing trunk group 124 to toll center 104 in the New York toll center area. By utilizing marker 122 and trunk block 123 at St. Louis an idle outgoing trunk is selected from trunk group 124 and sender 121 is then connected to the selected outgoing trunk in preparation for forwarding the digital information to the New York toll center 104. In this example no other intermediate regional centers are needed to complete the call, and since this call is to a local office within the New York toll center area, only the office code CH3 and the telephone number 1000 are outpulsed over the trunk selected in trunk group 124.

At St. Louis the proper linkages 128–130 are established to interconnect the incoming trunk in trunk group 114 from the Denver toll center 102, to the outgoing trunk in trunk group 124 to the New York toll center 104, and once this linkage has been established the common control equipment at St. Louis releases and becomes available to serve other calls.

Toll center 104 in the New York area receives the digital information in a manner similar to that just described and thereafter establishes a connection over an idle trunk in the group 131 to local office 108 which completes the call to the called customer 112.

From the foregoing description, it will be realized that each preceding link between two adjacent switching offices is established by testing for an idle trunk between the two offices, seizing the idle trunk, connecting common control equipment such as senders at each end of the trunk and pulsing information as to the called customer's telephone number over the trunk to the terminating office where the next succeeding link is established in the same manner.

*Call from Denver to New York via alternate route*

When toll center 102, in the foregoing example, received the ten digits including the New York area code, the called local office code and the telephone number for customer 112 in New York, the common equipment at toll center 102 ascertained the proper routing and tested for an idle trunk in the first choice trunk group 114. Had these trunks been occupied when the test was made, the common equipment at toll center 102 would have advanced to alternate route trunk group 115 and searched for an idle trunk in that group. If, however, an idle trunk was available in trunk group 114, as in the previous example, the idle trunk would be selected, and the common equipment at toll center 102 would then wait for an idle sender to be connected to the trunk at St. Louis. When the St. Louis sender, such as sender 121, is attached to the trunk the ten digits are outpulsed from toll center 102 to St. Louis followed by the release of the common control equipment at the Denver toll center 102.

Since the common equipment at St. Louis serves many high priority trunks, it may be preoccupied in handling other calls from Denver or calls from other toll centers in the network thus increasing the waiting time for the common equipment at particular toll centers including Denver that are trying to route calls through St. Louis. If the holding time of the common equipment at these toll centers is increased appreciably, these toll centers will be unable to efficiently handle other calls being switched through them thereby causing further delays at local offices, other toll centers and regional centers trying to route calls through these particular toll centers.

In other words, although a particular toll center, such as Denver toll center 102, has ample switching facilities for its normal busy hour traffic and although there are idle trunks available between this toll center and the St. Louis regional center 100, the Denver toll center is not aware of the unavailability of common equipment at St. Louis and its inability to dispose of calls directed over trunk group 114.

*Overload control arrangement*

To illustrate the operation of the overload control feature in this illustrative embodiment, let it be assumed that several calls from toll centers having access to St. Louis, such as Denver toll center 102 and Dallas toll center 103, are waiting to be served by the common equipment at St. Louis regional center 100. Let it also be assumed that the overload detector circuit 132 at St. Louis has been previously set to operate when a predetermined number of calls are waiting for service at St. Louis. This setting, of course, will be determined by prior traffic studies and is indicative of the amount of traffic that the St. Louis regional center 100 can efficiently handle before becoming seriously overloaded.

When the number of calls waiting at St. Louis reaches the critical predetermined number, the overload detector circuit 132 in FIG. 1 will send an "overload signal" over channel 133 to the toll centers in the network informing them that St. Louis is temporarily unable to handle any further calls and that these toll centers should use alternate routes to other regional centers, where possible, even though idle trunks may be available in the routes to St. Louis.

The overload signal is received at the Denver toll center 102, and the routing equipment thereat is prepared for alternate routing. Any subsequent calls through toll center 102 that would normally select St. Louis as a first choice route are now directed over trunk group 115 through the Chicago regional center 101 even though idle trunks may be available in first choice trunk group 114 to St. Louis.

The overload detector 132 continues to monitor the calls being served at St. Louis, and when the number of calls waiting thereat drops below the critical point a "no overload" signal is transmitted over channel 133 to the toll centers to restore the routing equipment at the various toll centers to normal.

Thus it can be seen that each toll center is automatically informed of the probable delay at the first choice regional center before the toll center attempts to select an idle trunk to the regional center. Toll center switching time is saved by reducing the unnecessary attempts to seize and test for an idle trunk in a route to a busy regional center although idle trunks may be available in this route. Furthermore, originating sender time out at the toll center, which is often caused by the delay in waiting for an available terminating sender at the regional center, is minimized thereby shortening the overall sender holding time at the toll centers and making this equipment available to serve other calls.

DETAILED DESCRIPTION

Figure 2:
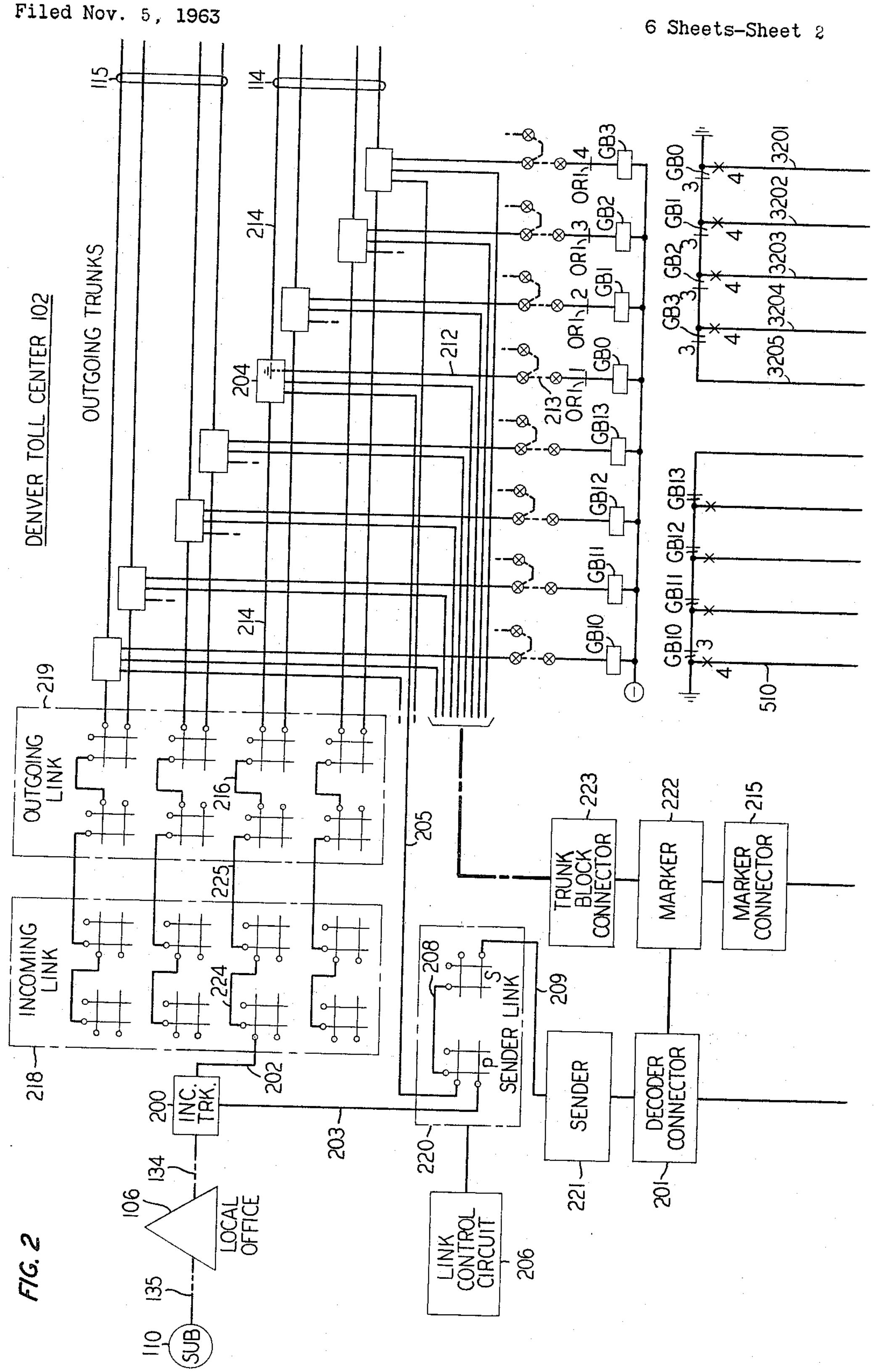
FIGS. 2–6 show a more detailed schematic representation of one specific illustrative embodiment of our invention in the same telephone switching network.
Figure 3:
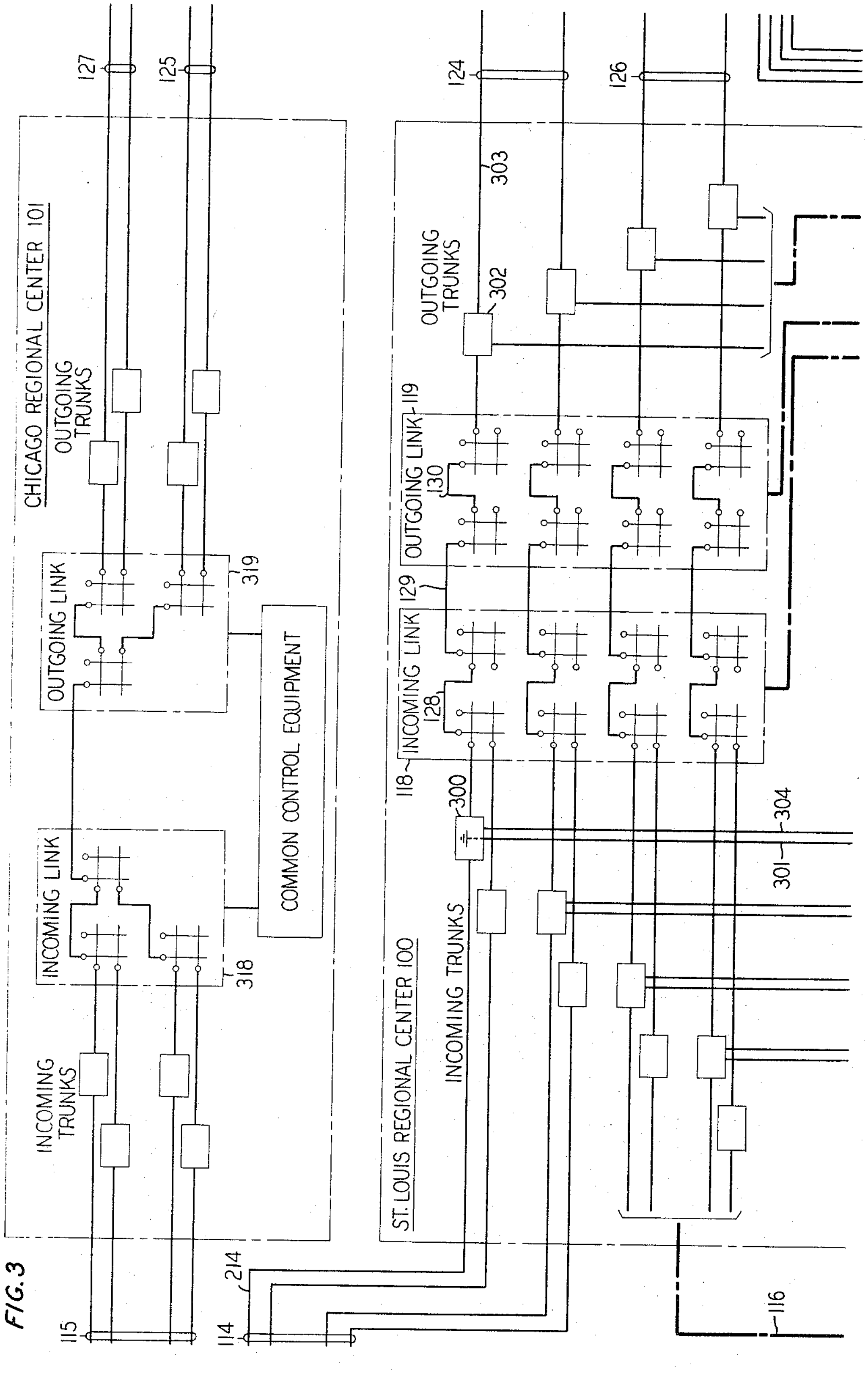
Figures 4, 7:
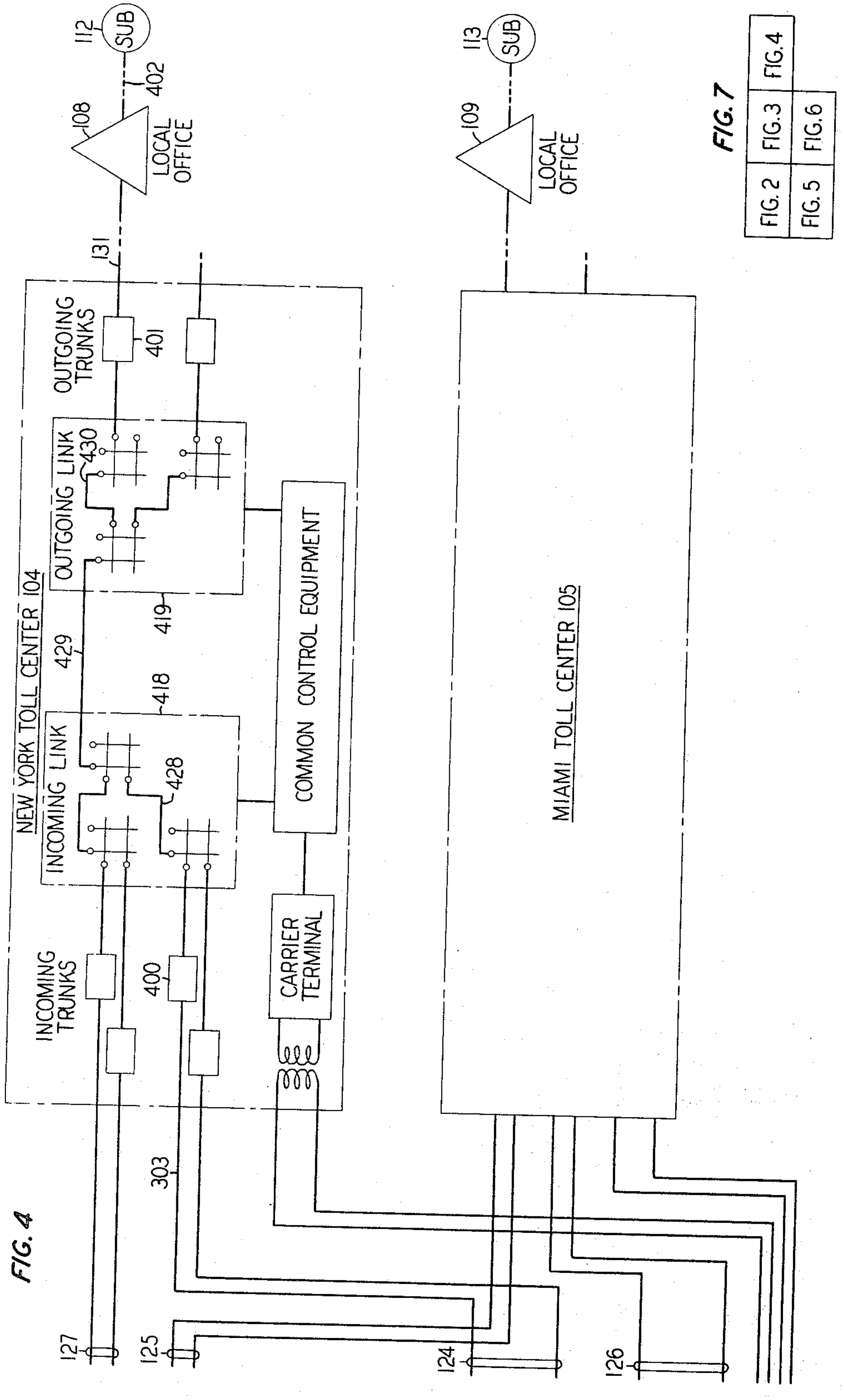
FIG. 7 shows the arrangement of FIGS. 2–6.

Referring now to FIGS. 2–6 as arranged in accordance with FIG. 7 there is shown a more detailed schematic representation of the illustrative embodiment of our invention that was set forth in the block diagram of FIG. 1.

A detailed description will now be given with respect to FIGS. 2–6, and wherever possible the reference designations that were used in the general description with reference to FIG. 1 have been retained for the same equipment shown in the more detailed FIGS. 2–6.

*Arrangement of equipment*

Figure 5:
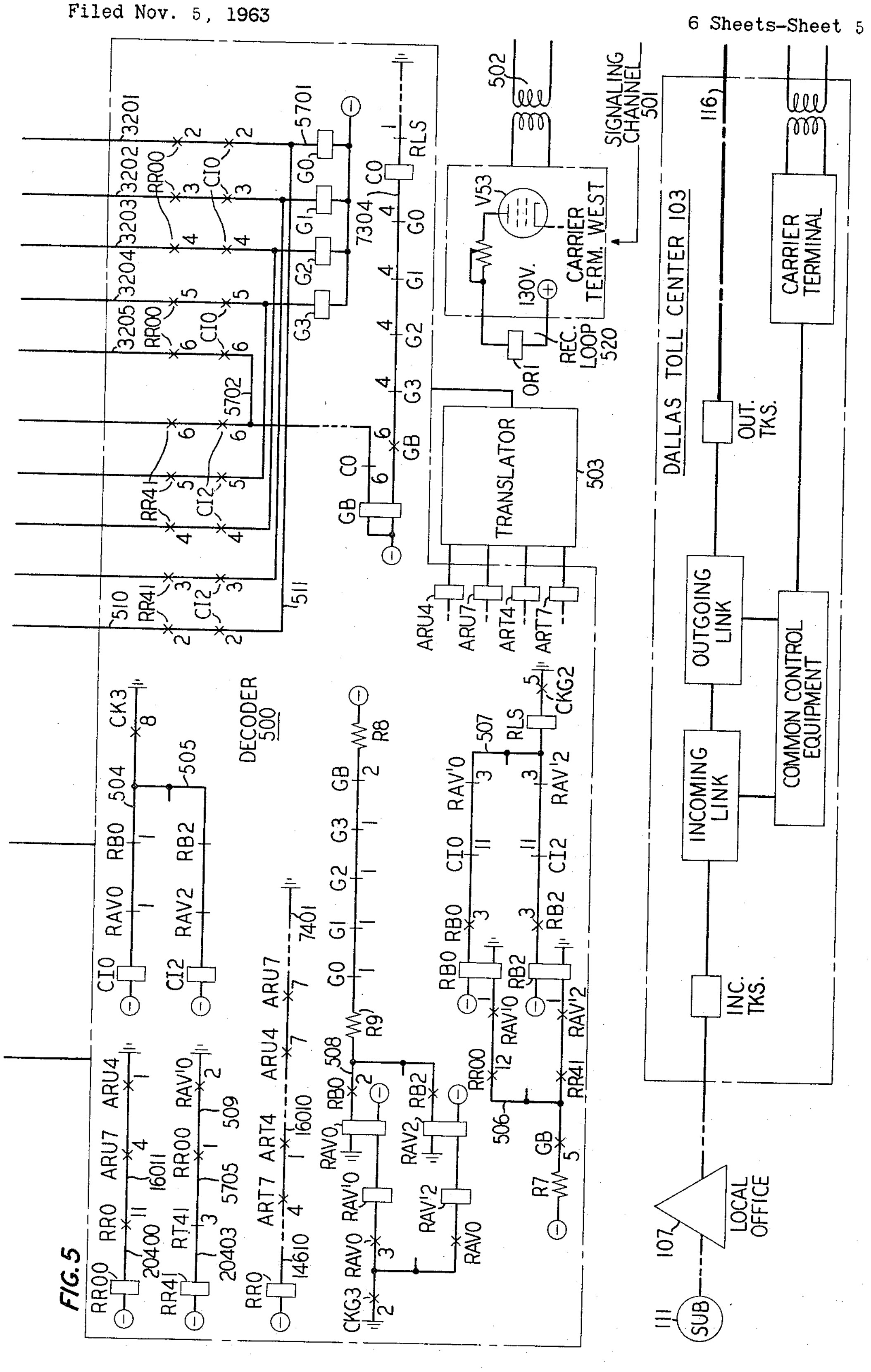
Figure 6:
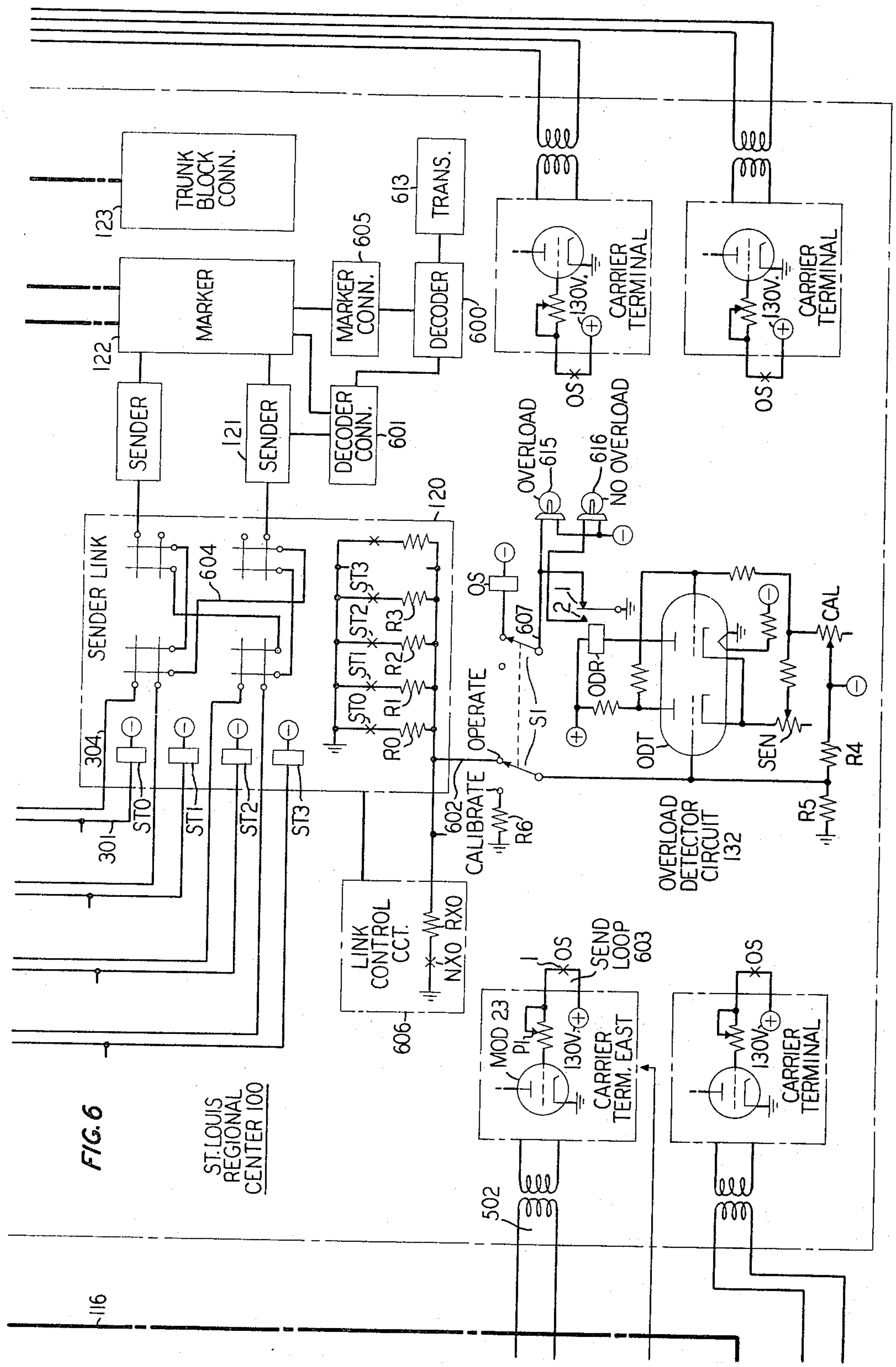

Looking at FIGS. 2–6 in their entirety, it can be seen that FIG. 2 shows local office 106 and a portion of Denver toll center 102 while FIG. 5 shows the remaining portion of Denver toll center 102 and the Dallas toll center 103. FIG. 3 shows the Chicago regional center 101 and a portion of the St. Louis regional center 100 while FIG. 6 shows the remaining portion of the St. Louis regional center 100. FIG. 4 shows the New York and Miami toll centers 104 and 105, respectively.

The toll centers and regional centers represented by the various figures herein can be any one of the many well-known switching systems. One example of a typical toll switching system is disclosed in Patent 2,868,884 granted to J. W. Gooderham et al. of Jan. 13, 1959, and is hereby incorporated by reference as though fully disclosed herein.

Turning first to FIGS. 2 and 5 there is shown the Denver toll center 102 which comprises incoming link 218 on which incoming trunks appear, outgoing link 219 on which outgoing trunks appear and various elements of common control equipment to be described in more detail below.

Local office 106 in FIG. 2 is connected over trunk 134 to incoming trunk equipment 200 which appears on incoming link 218 and sender link 220. Although only one trunk has been shown interconnecting local office 106 with the Denver tool center 102, it will be realized that many trunks may be provided between these and other switching centers and that the trunks represented herein may include wire facilities, carrier facilities, or radio links and the like.

A further description of the local switching offices 106–109 need not be given herein for a full understanding of the invention. It will be understood that any of the well-known switching systems such as crossbar, step-by-step, or the more recently developed electronic switching systems are equally suitable for this arrangement.

Incoming trunk equipment 200 at Denver is connected over conductors 203 to sender link 220. It is through sender link 220 and link control circuit 206 that incoming trunk 200 can be connected to one of the many available senders such as sender 221. More specifically, link control circuit 206 recognizes which incoming trunks are requesting service, tests and selects the proper type sender and then proceeds to close the appropriate crosspoints on sender link 220. Once connected to the incoming trunk, sender 221 functions to receive and store the digital information of the called customer as it is pulsed over trunk conductors 134 from local office 106. Sender 221 then passes the information, received from calling office 106, to decoder 500 (in FIG. 5) via decoder connector 201 in FIG. 2, and decoder 500 in conjunction with translator 503 utilizes this information to determine the proper routing to the called customer.

Once the routing has been ascertained, the various trunk groups in that route are surveyed by decoder 500 to determine which group of trunks has an idle trunk, and the decoder then directs marker 222 to test the group having at least one idle trunk by using trunk block 223 and thereby determine the particular trunks in the group that are idle. When the idle outgoing trunk such as trunk 204 is selected, it is connected to sender 221 over conductors 205 and the called number information is then outpulsed over trunk conductors 214 to the next adjacent switching center which is the St. Louis regional center 100 in the instant example.

For simplicity it has been assumed that Dallas toll center 103 in FIG. 5, the New York and Miami toll centers 104 and 105, respective in FIG. 4, the Chicago regional center 101 in FIG. 3 and the St. Louis regional center 100 in FIGS. 3 and 5 are identical to the Denver toll center 102 and no further description of the common control switching equipment for these other control switching points need be given at this time.

It will be recalled from the general description that the St. Louis regional center 100 served as an intermediate switching center in the first choice trunk routes for Denver and Dallas calls to and from the Miami and New York areas. Since St. Louis is located at such a vital cross section of the network, it is desirable to minimize the effects on the network of traffic overloads occurring at St. Louis. Moreover, it would be advantageous to predict an impending overload at St. Louis so that the necessary corrective measures can be taken at toll centers routing via St. Louis to avoid additional overloads at these toll centers and possible network congestion.

Referring now to FIG. 6, there is shown an overload detector circuit 132 advantageously located at the St. Louis regional center 100. Overload detector circuit 132 is connected to sender link 120 and link control circuit 606 via conductor 602, and it is over conductor 602 that overload detector circuit 132 can monitor the number of incoming trunks awaiting service at St. Louis. While we have found it convenient to measure traffic loads by monitoring the sender link and link control circuits in this one illustrative embodiment of our invention, it is to be understood that similar measurements can be made at other common control equipment. The choice of equipment, of course, depends on the nature of the traffic at a particular toll center and the type of switching equipment involved and is readily ascertainable using the well-known traffic measuring arrangements.

Overload detector circuit 132 is connected to each of the toll centers shown via a signaling channel for transmitting to these toll centers, signals which are indicative of the load condition at the St. Louis regional center 100. For example, the Denver toll center 102 is connected to the St. Louis regional center 100 over signaling channel 501 which comprises carrier line 502 interconnecting carrier terminals "West" and "East" at Denver and St. Louis, respectively.

A typical example of a carrier system which has been found applicable to this traffic control arrangement is disclosed in Patent 2,667,536 granted to L. A. Gardner and J. L. Hysko of Jan. 26, 1954, and the carrier terminals set forth in the Gardner-Hysko patent are hereby incorporated by reference as though fully disclosed herein.

In that patent, Gardner and Hysko disclose a frequency shift telegraph carrier system having a carrier terminal at each end of the carrier line and each carrier terminal including a "send" loop and a "receive" loop. When each terminal is turned "ON," i.e., has power connected to it, that terminal sends carrier signals over the interconnecting carrier line to the distant terminal receiving circuit. For our invention, only sending circuits are required in the carrier terminals at St. Louis and only receiving circuits in the carrier terminals at the various toll centers.

Having once turned the carrier terminals "ON" the terminals can transmit and receive frequency shift signals over their respective carrier lines. More specifically, when send loop 603 at carrier terminal "East" is open a first frequency, sometimes referred to as a "spacing" signal, is sent over the carrier line to the distant carrier terminal "West." When send loop 603 at carrier terminal "East" is closed, a frequency shift occurs and carrier terminal "East" transmits a second frequency, referred to as a "marking" signal, over carrier line 502 to the distant terminal. At the distant terminal, which in this example is carrier terminal "West," the receipt of a "marking" signal will close the distant terminal receive loop 520 and operate receive relay OR1 thereat. In other words, each time send loop 603 is closed, receive loop 520 is also closed to operate relay OR1 and when send loop 603 is opened receive loop 520 is also opened to release relay OR1.

A better understanding of the arrangement contemplated will be realized from the ensuing description with respect to the establishment of a typical call over the switching network.

*Call from Denver to New York via St. Louis*

Let it be assumed that customer 110 in the Denver toll center area wishes to call customer 112 in the New York toll center and let it also be assumed that there are available idle trunks in all of the routes interconnecting the various switching centers shown.

Customer 110 in the Denver area (FIG. 2), wishing to call customer 112 in the New York area (FIG. 4), lifts his telephone receiver and dials into local office 106 (FIG. 2) information as to the area code for New York followed by the local office code for local office 108 and telephone number assigned to customer 112. As previously assumed with respect to the general description, this information might consist of ten digits such as 212–CH3–1000 wherein the first three digits represent the New York area code, the next three digits are the local office code for local office 108 in the New York area and the last four digits represent the telephone number of customer 112.

The switching equipment (not shown) at local office 106 recognizes the area code as one assigned to a foreign area and selects an idle trunk such as trunk 134 to its home tandem office, which is the Denver toll center 102 (FIG. 1) in the instant example. When trunk 134 is seized by local office 106, incoming trunk equipment 200 is actuated and a signal is sent over conductors 203 to sender link 220 and link control circuit 206 requesting that the proper type sender be attached to incoming trunk 200. An idle sender is chosen, the select magnet of the proper switch level is operated and the hold magnets of the proper verticals on both the primary link switch and the secondary link switch of sender link 220 are operated by link control circuit 206 thus connecting incoming trunk 200 over conductors 203, link 208, conductors 209 to sender 221. When sender 221 is attached to trunk 200 a signal is transmitted back over trunk conductors 134 to local office 106, informing local office 106 that the pulses may now be transmitted for setting the registration relays in sender 221.

After the sender has received and registered the digits outpulsed from local office 106, sender 221 connects itself to decoder 500 via decoder connector 201. Decoder 500 functions in conjunction with translator 503 to translate the area code and office code into proper routing instructions so that the appropriate outgoing trunks can be selected.

Decoder 500 shown in FIG. 5 is identical to the decoder disclosed in the aforementioned Gooderham et al. patent, and wherever possible, the reference designations used in that patent have been retained herein.

In the Goderham et al. patent it was shown that each decoder in an assembly of control circuits for enabling the seizure of a translator which can translate the information concerning the destination of the desired call which is received from a sender, into information required by a marker to extend the desired connection to another control switching point. To enable the translation of information concerning the destination of a desired call into directive information for enabling a marker to control the establishment of a call, a card translator was disclosed in the Gooderham et al. patent. For simplicity, a similar translator, represented by block diagram designated 503, has been shown herein. It will be understood that a complete description of the translator and its capabilities can be found in the aforementioned Gooderham et al. patent; however, a brief description will be helpful at this time for a better understanding of the network arrangement.

As disclosed in the Gooderham et al. patent, the translator comprises a plurality of cards upon which various bits of information such as routing instructions, trunk locations, class of service, etc., are stored. Ordinarily the selection of the first card is determined by the area code digits received in the sender, but the local office code may also be used. Provision is made for various routing instructions such card-to-card, card-to-relay, relay-to-relay, etc., but for ease of illustration the description with respect to the instant invention will be limited to a call being handled on a relay-to-relay basis, and it will be obvious to those skilled in the art that this invention is also applicable to calls handled in various other ways.

On a call which is handled on a relay-to-relay basis as set forth in the Gooderham et al. patent, the first card selected in the translator will contain an "alternate-route pattern number" which enables the decoder to ascertain the proper route relay for the first choice trunk group.

Each route relay, such as relay RR00 in FIG. 5 is arranged to cut-in four subgroup chain leads capable of determining if there is an idle trunk in any one of the four corresponding subgroups of trunks which may contain as many as 40 trunks each. If an idle trunk is found in the first subgroup, the same card, which was selected by the translator for determining the route relay, can be read to determine the location of the trunks in this subgroup, and this information is passed to the marker for establishing the call. If an idle trunk is found in one of the other subgroups a new card, corresponding to the subgroup having an idle trunk, must be read by translator 503, and the trunk location information on this card is then forwarded to the marker. If no idle trunks are found in any of the four subgroups of the first choice trunk group, the decoder route advances by operating a route relay associated with an alternate route and thereafter tests the subgroups of trunks associated with the alternate-route trunk group in the manner just described.

Returning now to the description of the establishment of a call from customer 110 in FIG. 2 to customer 112 in FIG. 4, it will be recalled that local office 106 had pulsed the ten digits (212–CH3–1000) into toll center 102 and that these digits were registered on registration relays (not shown) in sender 221 and then forwarded to decoder 500 in FIG. 5 through decoder connector 201.

Let it be assumed that all routes outgoing from the Denver toll center 102 have idle trunks and that the route instructions for New York are to be ascertained from the alternate-route relay tree, i.e., on a relay-to-relay basis. When decoder 500 receives the area code and local office code (212–CH3, in the assumed example) from sender 221, it primes the translator 503 with this information. Using the area code and local office code a card is selected in translator 503 upon which the alternate-route pattern number for New York is punched, and when this card is read this information is sent to the decoder in the form of a two-digit number. Let it be assumed that the alternate-route pattern number for the call being traced is 00, and therefore, relays ART7, ART4, ARU7 and ARU4 in decoder 500 would be operated by translator 503, thereby indicating the alternate-route pattern number on a two-out-of-five basis. With these relays operated a circuit can be traced from battery, through the winding of relay RR0, through equipment not shown, over conductor 14610, through contacts 4 of relay ART7, through contacts 1 of relay ART4, over conductor 16010 and through equipment not shown, through contacts 7 of ARU4 and ARU7, through equipment not shown and over conductor 7401 to ground to operate relay RR0. Relay RR0, in operating, completes a circuit for operating route relay RR00. This circuit can be traced from battery, through the winding of relay RR00, over conductor 20400, through contacts 11 of relay RR0, over conductor 16011, and through contacts 4 and 1 of relays ARU7 and ARU4, respectively, to ground.

Prior to the operation of the above relays when decoder 500 was initially seized by sender 221, certain check relays, such as CK3 and CKG2, were operated to prepare decoder 500 for operation. While only the contacts of these relays have been shown in FIG. 5, it is to be understood that these relays were operated in accordance with the description given in the aforementioned Gooderham et al. patent, and no further description of these relays and their function need be given herein for a complete understanding of the instant invention. With relay CK3 operated, a circuit is closed from ground, through contacts 8 of relay CK3, over conductor 504, through contacts 1 of relay RB0, contacts 1 of relay RAV0, and through the winding of relay CI0 to battery, operating relay CI0. A similar path can be traced from ground through contacts 8 of relay CK3 and over conductor 505 for operating relay CI2.

With relays RR00 and CI0 operated, a circuit is prepared for testing for idle trunks in the four subgroups of the first choice route to New York which is trunk group 114.

The trunks as shown in the Gooderham et al. patent are arranged in four subgroups, each having as many as 40 trunks, with a group busy chain relay for each subgroup. A typical group busy arrangement is shown in FIG. 2, wherein relays GB0–GB3 are associated with the four subgroups of trunks in the first choice trunk group 114 to St. Louis, and relays GB10–GB13 are associated with the four subgroups of trunks in the alternate trunk group 115 to Chicago. Only one trunk in each subgroup has been shown and these trunks are cross-connected to their corresponding group busy (GB–) relays. When the trunk equipment, such as equipment 204, is idle it extends ground over conductor 212, cross connection 213, through normal contacts 1 of relay OR1, and through the winding of relay GB0 to battery holding relay GB0 operated. Similarly, the other trunks in subgroup 0 are cross-connected to GB0 extending their ground in parallel with trunk equipment 204, and as long as one trunk in this subgroup is idle, relay GB0 will be held operated. As each trunk is taken for use, ground is removed from its corresponding lead connected to the GB– relay, and when all trunks in a particular subgroup are in use the corresponding GB– relay will be released indicating an all-trunk-busy condition in that particular subgroup.

Since it was assumed that each subgroup in trunk group 114 had at least one idle trunk, relays GB0–GB3 will be operated, and relay GB0 extends ground through its contacts 4, and over conductor 3201 to the decoder in FIG. 5 where the ground is extended through contacts 2 of route relay RR00 and contacts 2 of relay CI0, over conductor 5701 and through the winding of relay G0 to battery, operating relay G0. Relay G0 in operating informs the decoder 500 that there is an idle trunk in the subgroup 0 of first choice trunk group 114 and that the trunk location information for the subgroup 0 trunks can be obtained from the first card that was read by translator 503.

Once the trunk location information and various other items of information such as code conversion, class of service, etc., is forwarded from the decoder 500, through marker connector 215, to marker 222, decoder 500 can release. Marker 222 then assumes control of the call and proceeds to test and select for an idle trunk in subgroup 0 of trunk group 114 through trunk block connector 223.

Having selected an idle trunk, such as trunk 204, marker 222 then identifies the incoming link 218 on which incoming trunk 200 appears and proceeds to establish a talking path between incoming trunk 200 and outgoing trunk 204 utilizing links 224, 225 and 216 in the toll center switch train.

In addition, marker 222 interconnects outgoing trunk 204 with sender 221 on sender link 220. Marker 222, decoder connector 201, and trunk block connector 223 are then permitted to release and sender 221 assumes control of the call waiting for an idle sender to be attached to the incoming end of trunk conductors 114 at the St. Louis regional center.

When trunk equipment 204 at the Denver toll center 102 in FIG. 2 was seized, a signal was transmitted over trunk conductors 214 to trunk equipment 300 in FIG. 3 at the St. Louis regional center 100. This signal requests that the common control equipment at the St. Louis regional center attach an idle sender to trunk equipment 300 to receive the digital information to be pulsed from Denver.

In a manner similar to that described with respect to the Denver toll center, trunk equipment 300 bids for an idle sender by signaling over conductor 301 to operate group start relay ST0 in FIG. 6. In the switching system being described each sender link can accommodate one hundred trunks which are divided into ten groups having ten trunks each. Each group of ten trunks is associated with a group start relay (ST–), and therefore, each sender link may have as many as ten ST–relays. The functions and operations of sender link 120 and link control circuit 606 in selecting an idle sender, such as sender 121, have been briefly described with respect to similar equipment at Denver toll center 102 and are more fully described in the Gooderham et al. Patent 2,868,884 or in Patent 2,293,191 granted to A. J. Busch et al. of Aug. 18, 1942. A further description of these operations need not be given here for a full understanding of the instant invention. Instead, let it be assumed that sender 121 has been connected over a link 604 on sender link 120 and over conductors 304 to trunk equipment 300, and when sender 121 is attached a start pulse signal is transmitted over this path and back over trunk conductors 214 to the Denver toll center over conductors 205 to sender link 220, over link 208 and conductors 209 to sender 221. Sender 221 receives the start pulse signal and proceeds to pulse the ten digits (212–CH3–1000) over this path to sender 121 at St. Louis where the digits are registered on sender registration relays not shown. Sender 221 at Denver can then release to serve other calls at the Denver toll center.

Upon the receipt of these ten digits, sender 121 is connected through decoder connector 601 to decoder 600 where the proper translator 613 is primed to determine the routing to the New York area.

In the instant example, calls from the St. Louis regional center 100 to New York are routed over trunk route 124, and decoder 600 ascertains this information from translator 613 and directs marker 122 in FIG. 6 to select an idle trunk, such as trunk 302, in trunk group 124. Marker 122 then connects outgoing trunk 302 with incoming trunk 300 via links 128, 129 and 130 on the incoming and outgoing links of the St. Louis switch train. From decoder 600 and through marker connector 605, marker 122 receives the necessary information to be outpulsed to New York, and marker 122 assumes control of the call permitting decoder 600 to release. The marker then attaches sender 121 to outgoing trunk 302 via circuitry not shown and marker 122 releases permitting sender 121 to take over control of the call.

Once sender 121 is connected to trunk 302 a signal is transmitted over trunk conductors 303 to the New York toll center 104 requesting that an idle sender be attached to trunk 400 at New York in order to receive the information to be outpulsed from sender 121 at St. Louis. Since the St. Louis regional center 100 routes calls directly to the New York area, the area code for New York (212) can be deleted at St. Louis, and only the local office code CH3 and the called number 1000 need be outpulsed over trunk conductors 303 to the New York toll center 104.

At the New York toll center 104 a connection, including links 428, 429 and 430 is established to outgoing trunk 401 which is connected to local office 108 over trunk conductors 131, and the four digits (1000) of the called customer 112 are pulsed over conductors 131 to local office 108 causing the common control equipment thereat to establish a connection over line conductors 402 to called customer 112.

A ringing signal is then transmitted to customer 112 over his line conductors 402 by equipment at local office 108, and when customer 112 responds by lifting his telephone receiver, he can converse with the calling customer 110 over a communication path including (in FIG. 2) subscriber line conductors 135, a switch train (not shown) in local office 106, trunk conductors 134 to the Denver toll center 102, conductors 202 and links 224, 225 and 216 through the Denver toll center switch train and trunk conductors 214 to the St. Louis regional center 100 in FIG. 3, links 128, 129 and 130 in the St. Louis regional center 100 switch train and trunk conductors 303 to the New York toll center 104 in FIG. 4, links 428, 429 and 430 in the New York toll center 104 switch train, and trunk conductors 131 to local office 108 where the connection is extended over line conductors 402 to customer 112.

*Overload control and alternate routing features*

In the above description of the establishment of a call over the network from customer 110 to customer 112, it was assumed that the network was experiencing normal traffic and that idle trunks were available in all of the first choice trunk routes.

Let it now be assumed that the St. Louis regional center, depicted by FIGS. 3 and 6, is being subjected to an abnormal amount of traffic, and although trunks may be available to and from the St. Louis regional center, the common equipment capacity at St. Louis is overburdened, and calls trying to gain access to St. Louis are experiencing a longer waiting interval for common equipment, such as senders and the like, at St. Louis.

Rather than permit futile attempts to gain access to the St. Louis regional center during such an overload, it is desirous to notify the control switching points making these repeated attempts to select other available routes. By directing these switching points to select other routes, the common equipments at these switching points will not be held unnecessarily for prolonged periods while waiting for a sender, for instance, at the overloaded St. Louis office.

If certain precautionary measures are not taken when the St. Louis regional center begins to experience an overload, those toll centers having first choice trunk groups to St. Louis will continue to select idle trunks in these groups until all trunks in these groups are busy, thus adding to the overload situation which already exists at St. Louis. Moreover, the sender equipment attached at these toll centers to the trunks outgoing to St. Louis will begin timing out while waiting for a sender to be attached at the St. Louis regional center. The sender time out arrangements are well known in the art and generally result in the return of an overflow or reorder signal to calling customer who must then make another attempt to complete the call.

It can readily be seen, therefore, that if such a situation is allowed to persist, additional traffic at the toll centers is falsely generated by customers making numerous second attempts to complete calls which would have been completed as a single call had their original attempt been successful. The result of this increase in traffic at the toll centers naturally degrades service in the entire toll center area, since numerous other calls within the toll center area are also being inefficiently switched through the home toll center control switching point.

To preclude the "backing up" of toll traffic in the network, there is advantageously located at the St. Louis regional center 100, in accordance with an aspect of our invention, an overload detector circuit 132. In this illustrative embodiment, overload detector circuit 132 is connected over conductor 602 to sender links 120 and link control circuit 606 to effectively monitor the traffic waiting for service at St. Louis.

Overload detector circuit 132 comprises a trigger circuit including tube ODT, an overload detection relay ODR operated by tube ODT, and a signaling arrangement controlled by relay OS. It should be understood that the detector arrangement shown herein is merely illustrative, and it will be obvious to those skilled in the art that many other detector circuits can be substituted for the arrangement shown without departing from the spirit and scope of the instant invention.

Turning now to FIG. 6 for a more detailed description of overload detector circuit 132, it can be seen that the potential on the grid circuit of tube ODT is dependent on the value of resistances R4 and R5 and the number of resistances RX0 and R0–R3 that are made effective by their corresponding relays NX and STO–ST3. It will be recalled that the operation of a group start relay (ST–) is an indication that one of the incoming trunks in the corresponding group of trunks has been seized and is requesting a link control circuit to select and attach a sender to the trunk. The NX– relays, on the other hand, indicate those link control circuits that are busy interconnecting trunks and senders at the various sender links. Of course, it will be realized that if other equipment is monitored, relays in that equipment similar to the ST– or NX– can be provided for controlling the bias on tube ODT. Thus, the more ST– or NX– relays that are operated, the less negative the grid of tube ODT becomes until the left section of tube ODT is "triggered on," that is, it conducts and the right section of tube ODT is cut off.

The adjustment of the "triggering point" of tube ODT is accomplished by operating switch S1 to the calibrate position to connect resistance R6 to the grid circuit of tube ODT. The value of resistance R6 is selected to simulate the desired quantity of ST– and NX– relays which the trigger circuit is to operate, and of course, the selection of the number of ST– and NX– relays is determined on the basis of previous traffic studies for the given switching center.

With switch S1 operated to the calibrate position the calibrate potentiometer CAL can be adjusted to "fire" the left section of tube ODT, and when the left section of ODT is conducting the right section is cut off releasing relay ODR and lighting overload lamp 615. The calibration potentiometer CAL is then "backed off" just enough to prevent the left section of tube ODT from conducting as indicated by the operation of relay ODR and the lighting of no overload lamp 616. If however, it is found that a considerable wide margin of adjustment must be made to the calibration potentiometer CAL in order to change the circuit from an "overload" to a "no overload" condition, sensitivity potentiometer SEN can be adjusted to compensate for this. After satisfactory adjustment has been made, switch S1 is restored to its operate position thereby connecting overload detector circuit 132 over conductor 602 to sender link 120 and link control circuit 606.

Having priorly adjusted overload detector circuit 132, tube ODT will now be "triggered on" when a predetermined number of ST– and NX– relays operate to indicate that an abnormal amount of traffic is waiting for service at St. Louis.

Let it now be assumed that many trunks are waiting for service at the St. Louis regional center 100 and that these trunks have their corresponding ST– relays operated and also let it be assumed that link control circuits are busy controlling the connections between sanders and trunks so that the number of operated NX– relays in combination with the operated ST– relays changes the grid bias on tube ODT permitting the left section of tube ODT to conduct. When the left section of tube ODT conducts, the right section of tube ODT cuts off thereby releasing relay ODR which opens its contacts 2 and closes its contacts 1 to extinguish no overload lamp 616 and light overload lamp 615. In addition, relay ODR completes an operating circuit over conductor 607 and through switch S1 to operate relay OS which functions to transmit an overload signal to the various toll centers in the network.

Interconnecting the toll centers with the St. Louis regional center are signaling channels, such as signaling channel 501 between the Denver toll center 102 in FIG. 5 and the St. Louis regional center 100 in FIG. 6. When relay OS is operated as a result of an overload being detected by overload detector 132, relay OS closes its contacts 1 which close send loop 603 at carrier terminal "East" by extending 130 volts positive potential through contacts 1 of relay OS, through potentiometer P1, to the grid circuit of modulator tube 23. It will be recalled that the carrier terminals represented herein are identical to those disclosed in Patent 2,667,536 granted to L. A. Gardiner and J. L. Hysko on Jan. 26, 1954, and when the send loop of a carrier terminal is closed, a "spacing" signal is sent over the carrier line to the distant carrier terminal which is carrier terminal "West" at the Denver toll center in the instant example. Upon receiving a "spacing" signal, receive tube V53 at carrier terminal "West" conducts, closing receive loop 520 and operating overload receive relay OR1 in FIG. 5.

Overload receive relay OR1, in operating, opens its contacts 1 through 4 (shown in FIG. 2) thereby opening the group busy chain leads for the four subgroups of trunks in the first choice trunk group 114 to the St. Louis regional center.

It will be recalled from the previous description that decoder 500 at the Denver toll center utilized these group busy chain relays to ascertain which subgroups contain idle trunks before directing marker 222 to test and select a particular trunk in a subgoup. The grounds from idle trunk equipments such as trunk equipment 204 normally hold relays GB0–GB3 operated indicating to decoder 500 that idle trunks are available in these subgroups, but now having received an overload signal from the St. Louis regional center, the GB0–GB3 relays associated with trunk group 114 to St. Louis are forced to release marking trunk group 114 appear busy to subsequent calls even though trunks may be idle in this group.

*Route advance feature*

To further illustrate the decoder operation at the Denver toll center when St. Louis is in an overloaded condition, let it be assumed that customer 110 in FIG. 2 is trying to extend a call to customer 112 in FIG. 4, as previously described, and that the call has progressed to the Denver toll center 102 where translator 503 has been primed with the area code and local office code (212–CH3) for call customer 112. As with the previous example, the first card is read in translator 503 operating alternate route pattern relays ART7, ART4, ARU7 and ARU4 indicating that the alternate route pattern number for New York is 00. These relays close through the previously traced path for operating relay RR0 and route relay RR00. Route relay RR00 and previously operated relay CI0 extend conductors 3201–3205 from contacts of the group busy chain relays GB0–GB3 to relays G0–G3 in decoder 500 permitting the decoder to determine if idle trunks are available in these subgroups. Since group busy chain relays GB0–GB3 have now been released by the operation of overload receive relay OR1, relays G0–G3 will also be released and ground will be extended through normal contacts 3 of relays GB0, GB1, GB2 and GB3 and over conductor 3205 and through contacts 6 of relays RR00 and CI0, over conductor 5702, through equipment now shown and through contacts 6 of relay C0 to the upper winding of relay GB in decoder 500. Relay GB operates indicating an all trunk group busy and extends battery through its lower winding, through its contacts 6 and through normal contacts 4 of relays G3, G2, G1 and G0, over conductor 7304 and through the winding of relay C0 and contacts 1 of relay RLS, through equipment not shown to ground, operating relay C0 and furnishing a locking path for relay GB under control of relay RLS.

In addition, relay GB extends battery through resistance R7 and its contacts 5, over conductor 506, through contacts 12 of route relay RR00, through contacts 1 of relay RAV'0 and through the lower winding of relay RB0 to ground operating relay RB0. In operating, relay RB0 completes a circuit which can be traced from battery, through the upper winding of relay RB0, through contacts 3 of relay RB0, through contacts 11 of relay CI0, contacts 3 of relay RAV'0 and over conductor 507, through the winding of relay RLS and contacts 5 of relay CKG2 to ground, to operate relay RLS and lock relay RB0 under control of its upper winding.

When relay RB0 operated, it opened its contacts 1 to release relay CI0, and when relay CI0 releases, it opens its contacts 2–6 to disconnect conductors 3201–3205 from relays G0–G3 and relay GB in decoder 500. The locking path for relay GB having previously been interrupted by the operation of relay RLS, the operating path for relay GB is now interrupted by the release of relay CI0, and relay GB releases.

With relays G0–G3 and relay GB released, a circuit is completed for operating a route advance relay. This circuit can be traced from battery, through resistance R8, through contacts 2 of relay GB, through contacts 1 of relays G3, G2, G1 and G0, through resistance R9, over conductor 508, through contacts 2 of relay RB0 and through the upper winding of route advance relay RAV0 to ground operating relay RAV0. With relay RAV0 operated, battery is extended through the lower winding of relay RAV0, through the winding of auxiliary relay RAV'0 and through contacts 3 of relay RAV0 to ground at contacts 2 of relay CKG3 thereby operating relay RAV'0 and locking relay RAV0 under control of relay CKG3.

Relay RAV0, at its contacts 1, further interrupts the operating circuit for relay CI0.

Relay RAV'0, in operating, opens its contacts 1 to further interrupt the operating circuit for relay RB0 and opens its contacts 3 to interrupt the locking circuit for relay RB0 and the operating circuit for relay RLS. Both relays RB0 and RLS release. Furthermore, relay RAV'0 completes an operating path for route relay RR41 associated with the alternate trunk group 115. This circuit can be traced from ground at contacts 2 of relay RAV'0, over conductor 509, through contacts 1 of relay RR00, over conductor 5705, through normal contacts 3 of relay RT41 and over conductor 20403 and through the winding of route relay RR41 to battery. With route relay RR41 operated and relay CI2 having previously been operated, test leads from relays G0–G3 and relay GB in the decoder are extended to the group busy chain relays for subgroups GB10 to GB13 associated with the alternate route trunk group 115.

If it is assumed that idle trunks are available in each of the four subgroups of trunk group 115, relays GB10–GB13 will be operated, and with group busy chain relay GB10 operated, ground is extended through its contact 4, over conductor 510 to contacts 2 of relays RR41 and CI2 and over conductor 511 and through the winding of relay G0 to battery operating relay G0. Relay G0, in operating, informs decoder 500 that an idle trunk is available in the first subgroup of trunk group 115 to Chicago, and decoder 500 causes translator 503 to read a card associated with this subgroup, so that marker 222 can test and select an idle trunk over this route to Chicago.

Once the trunk location information has been forwarded to marker 222, decoder 500 can release and marker 222 then proceeds to establish a connection to an idle outgoing trunk in group 115 and attach sender 221 to the idle trunk. Under the assumed conditions, the call will be extended from the Denver toll center 102 through the Chicago regional center 101 to the New York toll center 104 and on to local office 108 and call customer 112. This portion of the call is established in the same manner as previously described and need not be reiterated here for complete understanding of the invention.

The overload detector circuit 132 at St. Louis will continue to transmit an overload signal to the various toll centers in the network as long as the traffic overload condition at St. Louis persists. After some of the calls waiting at St. Louis have been properly disposed of and the load thereat sufficiently diminished as indicated by the number of remaining simultaneously operated NX- and ST-relays, the left section of overload detector tube ODT will automatically go off reoperating relay ODR which in turn releases relay OS. When relay OS releases it opens send loop 603 at carrier terminal "East" causing that terminal to send a "spacing" signal over carrier line 502 to carrier terminal "West." The receipt of a "spacing" signal at carrier terminal "West," opens receive loop 520 releasing relay OR1.

It will be recalled that when relay OR1 operated it disconnected the group busy chain relays GB0–GB3 from their associated trunks in the first choice trunk group 114 thus making the set trunks appear busy to decoder 500. With the overload signal no longer being transmitted to the toll centers and relay OR1 released, the trunks in trunk group 114 are reconnected to chain relays GB0–GB3 and decoder 500 is once again permitted to test and select idle trunks from this group on a regular basis.

While there is shown herein one specific arrangement for controlling the distribution of traffic in a communication network, that is, by causing alternate routing at originating toll centers, it will be readily apparent to those skilled in the art that many other methods can be used without departing from the spirit and scope of this invention.

For instance, in the Gooderham et al. Patent 2,868,884 there was described an arrangement referred to as alternate route traffic control. By use of the alternate route traffic control features, traffic can be selectively rerouted to relieve congested routes. More specifically when traffic is exceptionally heavy in a particular route, the associated route transfer relay may be operated so that only calls using that route as an original route may be completed thereover and any traffic attempting to gain access o that route as an alternate route will be denied access. It can readily be seen, therefore, that an overload signal from the St. Louis regional center 100 can be used to actuate a route transfer relay such as relay RT41, the contacts of which have been shown in the opearting path for route relay RR41, to automatically actuate the alternate route traffic control feature and deny access to selected traffic.

It is to be understood that the above described arrangements are merely illustrative of the applications of the principles of the invention, numerous other arrangements may be devised by those skilled in the art without departing from the spirit and scope of the invention.

What is claimed is:

1. In combination, a switching office having incoming trunks, outgoing trunks, and switching means responsive to service request signals on said incoming trunks for interconnecting said incoming and outgoing trunks, a first office connectable to the originating end of said incoming trunks, a second office connectable to said outgoing trunks, means including alternate trunks for interconnecting said first and second offices, and load sensing means at said switching office effective in response to service request signals related to a predetermined number of said incoming trunks for rendering unavailable the originating end of said incoming trunks and for rendering said alternate trunks available for connection at said first office.

2. In combination, a switching office having incoming trunks, outgoing trunks, and common control means for interconnecting said incoming and outgoing trunks, a first office connectable to the originating end of certain of said incoming trunks when said certain incoming trunks are available, a second office connectable to said outgoing trunks, means including alternate trunks for interconnecting said first and second offices, means at said first office for selecting trunks available thereat, means at said switching office responsive to the selection of one of said incoming trunks for connecting said common control means to said selected trunk, load detecting means at said switching office effective when a predetermined number of said incoming trunks have been selected and prior to the connection of said common control means thereto for signaling said first office, and means at said first office responsive to a signal from said switching office for rendering the originating end of said incoming trunks unavailable and for rendering said alternate trunks available to said trunk selecting means.

3. In a switching network, a switching office having incoming trunks, outgoing trunks and switching means responsive to service request signals on said incoming trunks for interconnecting said incoming and outgoing trunks, calling offices connectable to the originating ends of said incoming trunks when said incoming trunks are available, called offices connectable to said outgoing trunks, means including alternate trunks for interconnecting said calling and called offices, trunk selecting means at each of said calling offices, and load detecting means at said switching office effective in response to service request signals from a predetermined number of said incoming trunks for controlling said trunk selecting means to render the originating end of said incoming trunks unavailable and to render said alternate trunks available to said calling offices.

4. In a switching network, a switching office having incoming trunks, outgoing trunks and switching means responsive to service requests on said incoming trunks for interconnecting said incoming and outgoing trunks, a calling office connectable to the originating end of certain of said incoming trunks, a called office connectable to certain of said outgoing trunks, means including alternate trunks for interconnecting said calling and called offices, trunk selecting means at said calling office, a signaling channel interconnecting said switching office with said calling office, means at said switching office effective when a predetermined number of incoming trunks are awaiting service thereat for transmitting a signal over said channel to said calling office, and means at said calling office responsive to said signal for controlling said trunk selecting means to render the originating end of certain of said incoming trunks unavailable and to render said alternate trunks available to said calling office.

5. In a switching network, a switching office having incoming trunks, outgoing trunks and switching means responsive to service requests on said incoming trunks for interconnecting said incoming and outgoing trunks, calling offices connectable to the originating end of said incoming trunks when said incoming trunks thereat are available, called offices connectable to said outgoing trunks, means including an alternate office and alternate trunks for interconnecting said calling and called offices, trunk test means at said calling offices for ascertaining the busy condition of the originating end of said incoming trunks, signaling channels interconnecting said switching office with said calling offices, means at said switching office for detecting when a predetermined number of said incoming trunks are attempting to obtain service for the establishment of a connection through said switching office, and means controlled by said detecting means for transmitting a first trunk make-busy signal over said channels to said calling offices, said trunk test means including means effective when the originating end of said incoming trunks are made busy for causing the selection of said alternate trunks.

6. The invention defined in claim 5 wherein means are provided at said calling offices responsive to said make-busy signal transmitted over said channel for rendering the originating end of said incoming trunks busy to said trunk test means.

7. In a switching network, a switching office having incoming trunks, outgoing trunks and switching means responsive to service requests on said incoming trunks for interconnecting said incoming and outgoing trunks, a calling office connectable to the originating end of certain of said incoming trunks when said certain incoming trunks are available, a called office connectable to certain of said outgoing trunks, means including alternate trunks for interconnecting said calling and called offices, trunk test means at said calling office for ascertaining the busy condition of the originating end of certain of said incoming trunks, a signaling channel interconnecting said switching office with said calling office, a plurality of detecting devices coupled to said incoming trunks at said switching office and each operative in response to a service request signal on a corresponding incoming trunk, a load sensing means coupled to said devices and effective when a predetermined number of said devices are simultaneously operated for transmitting a load signal over said channel to said calling office, and means at said calling office responsive to said load signal for rendering the originating end of certain of said incoming trunks busy to said trunk test means, said trunk test means including means effective when said certain incoming trunks are busy for causing the selection of said alternate trunks.

8. The invention defined in claim 7 wherein said load sensing means comprises circuit means effective when a predetermined number of said devices are simultaneously operated, and means controlled by said circuit means for transmitting said load signal.

9. The invention defined in claim 8 wherein said circuit means includes variable input means coupled to said devices for rendering said circuit means effective when said input means is energized at a prescribed value, and wherein said devices include means for energizing said input means at said prescribed value in accordance with said predetermined number of simultaneously operated devices.

10. The invention defined in claim 9 wherein said circuit means also includes means independent of said devices for energizing said input means in accordance with different numbers of said simultaneously operated devices.

11. In a switching system a first office; a second office; a switching office comprising a first group of trunks accessible to said first office, a second group of trunks accessible to said second office, and switching means effective when available for interconnecting vacant trunks in said first and second groups; means including an alternate group of trunks accessible to said first office for interconnecting said first and second offices independently of said switching means; routing means at said first office responsive to a service request signal for said second office and effective when at least one first group trunk is vacant for directing a connection to said vacant first group trunk; and load sensing means at said switching office responsive to the unavailability of said switching means for causing said first office routing means to direct a connection to a said alternate trunk independent of the availability of a vacant first group trunk.

12. A telephone switching network comprising a switching office having first trunks, second trunks, and switching means responsive when available to service request signals on said first trunks for interconnecting said first and second trunks, a called office, a calling office connectable to said called office over a first route comprising said first and second trunks interconnected at said switching office, an alternate route for interconnecting said calling and salled offices independently of said switching office, route selecting means at said calling office, a signaling channel interconnecting said switching and calling offices, means for transmitting over said channel a routing signal indicative of the availability of said switching means at said switching office, a plurality of disabled input means at said switching office, a plurality of relay means coupled to said first trunks at said switching office and each responsive to a service request signal on a said first trunk for enabling a corresponding one of said input means, detecting means controlled by said input means and effective when a predetermined number of said input means are enabled for actuating said signal transmitting means, and means at said calling office responsive to the receipt of a routing signal over said channel for causing said route selecting means to deny access to said first trunks.

13. In a communications network, a plurality of switching centers including a calling center, a called center, and an intermediate center, a plurality of trunks interconnecting said intermediate and said calling and called centers, means at said calling center for determining the availability of a trunk from said calling center to said intermediate center, common control means at said intermediate center, means at said intermediate center for determining the switching load of said common control means, signaling means responsive to said switching load determining means and interconnecting said intermediate center and said calling center, and means at said calling center responsive to said signaling means for causing said trunk determining means to indicate no trunks available regardless of the availability of trunks between said calling and intermediate centers.

14. In a communications network, a plurality of switching centers including a calling center, a called center, a primary intermediate center, and an alternate intermediate center, a plurality of trunks interconnecting said intermediate and said calling and called centers, means at said calling center for testing the availability of trunks to said primary intermediate center and for establishing connections to trunks to said alternate intermediate center if said trunks to said primary intermediate center are busy, common control means at said primary intermediate center, means at said primary intermediate center for determining the switching load of said common control means, signaling means responsive to said determining means and interconnecting said primary intermediate center and said calling center, and means at said calling center responsive to said signaling means for causing said testing and establishing means to establish connections to trunks to said alternate intermediate center regardless of the availability of trunks to said primary intermediate center.

15. A telephone switching network comprising a switching office, a plurality of calling offices, a plurality of called offices, first trunks interconnecting said calling offices and said switching offices, second trunks interconnecting said called offices and said switching office, alternate routes for connecting said calling and called offices independently of said switching office, switching means at said switching office for interconnecting said first and said second trunks, means at said switching office for determining the number of first trunks seeking connection through said switching means, signaling means interconnecting said switching and calling offices and responsive to said determining means, and means at said calling offices responsive to said signaling means for connecting said calling offices to said alternate routes irrespective of the availability of first trunks from said calling offices to said switching office.

16. In a telephone switching system, a switching office, a plurality of calling offices, a plurality of called offices, a plurality of trunks interconnecting said switching office and said calling and caled offices, alternate route means for connecting said called and calling offices independently of said switching office, sender means at said switching office, means at said switching office for determining the member of trunks awaiting initial service by said switching office and awaiting connection to said sender means, signaling means responsive to said determining means and interconnecting said switching and calling offices, and means at said calling office responsive to said signaling means for connecting said calling offices to said alternate route means independent of the availability of trunks from said calling offices to said switching office.

17. In a telephone switching system, a main switching office, an alternate switching office, a plurality of calling offices, a plurality of called offices, first trunks interconnecting said calling offices and said main switching office, second trunks interconnecting said called offices and said main switching offices, alternate trunks interconnecting said alternate switching office and said calling and called offices, means at said calling offices for testing the availability of first trunks to said main switching office and for establishing connections to said alternate trunks if said first trunks are busy, sender means at said main switching office for connection to said first trunks, means at said main switching office for sampling the number of trunks awaiting initial service by said main switching office, means at said main switching office for determining the number of trunks awaiting connection to said sender means, signaling means responsive to said sampling and determining means indicating a predetermined number of unserved trunks for transmitting a signal to said calling offices, and means at said calling offices for causing said testing and establishing means to establish connections to said alternate trunks independent of the availability of first trunks to said main switching office.

References Cited

UNITED STATES PATENTS

| | | | |
|---|---|---|---|
| 2,857,467 | 10/1958 | Molnar | 179—18.21 |
| 3,033,934 | 5/1962 | Evans | 179—18.21 |
| 3,098,125 | 7/1963 | Berch | 179—18.21 |
| 3,211,836 | 10/1965 | Warman | 179—18.21 |
| 3,231,676 | 1/1966 | Carlstrom et al. | 179—18.21 |

KATHLEEN H. CALFFY, *Primary Examiner.*

L. A. WRIGHT, *Assistant Examiner.*